Figure 5:
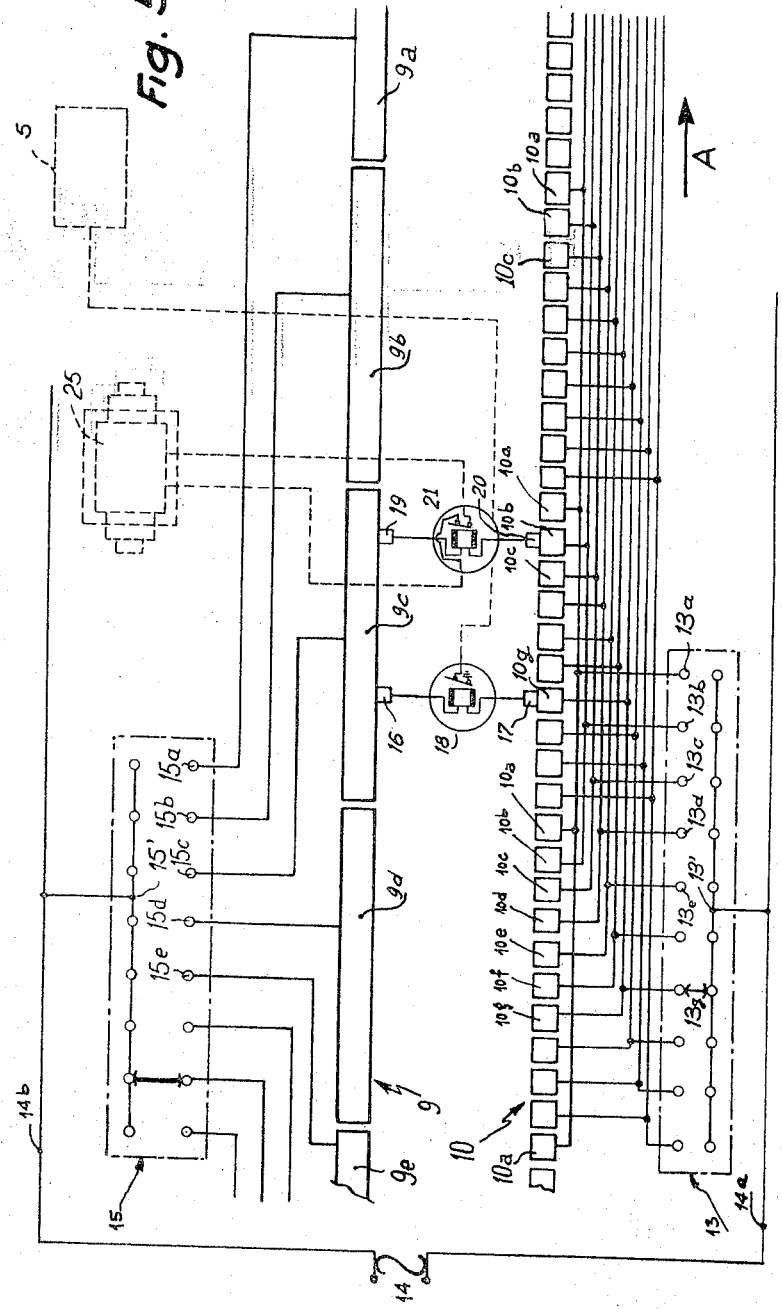

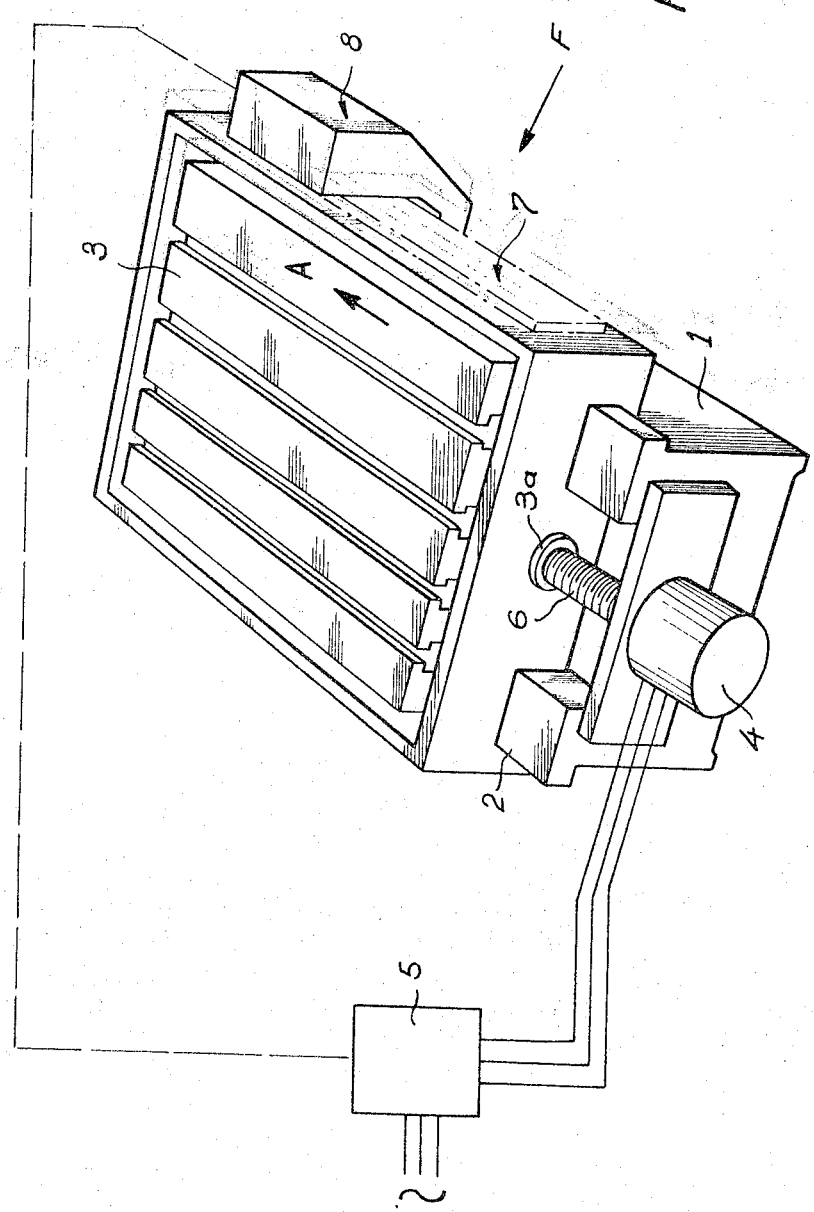

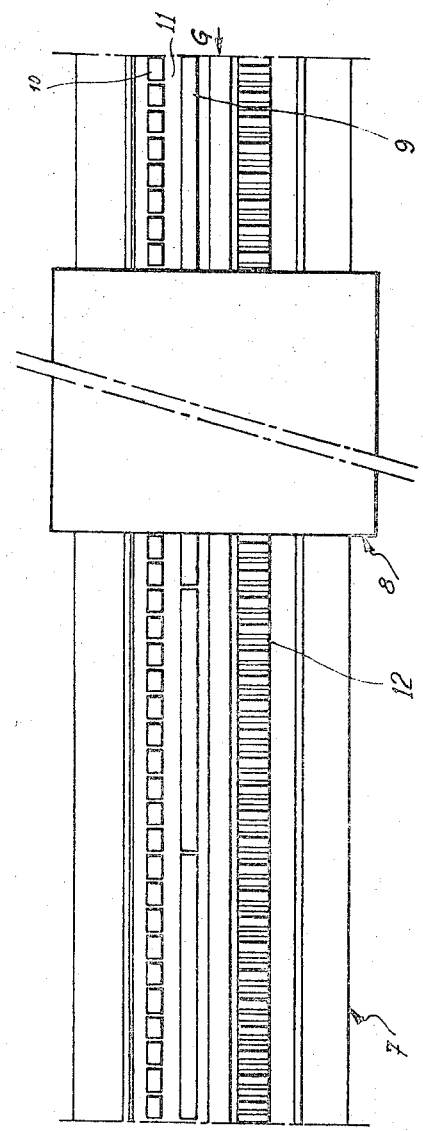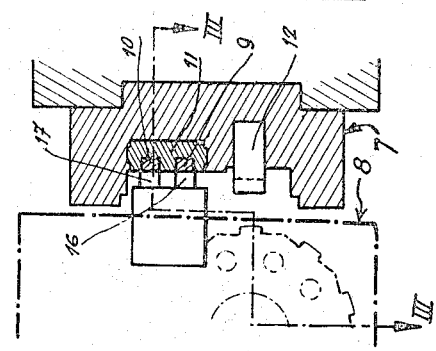

Feb. 28, 1967  P. PEGARD  3,307,083
DEVICE FOR THE CONTROL OF THE DISPLACEMENT OF A MOVABLE ELEMENT
APPLICABLE ESPECIALLY TO MACHINE TOOLS
WITH NUMERICAL DEFINITION
Filed May 23, 1963  6 Sheets-Sheet 3
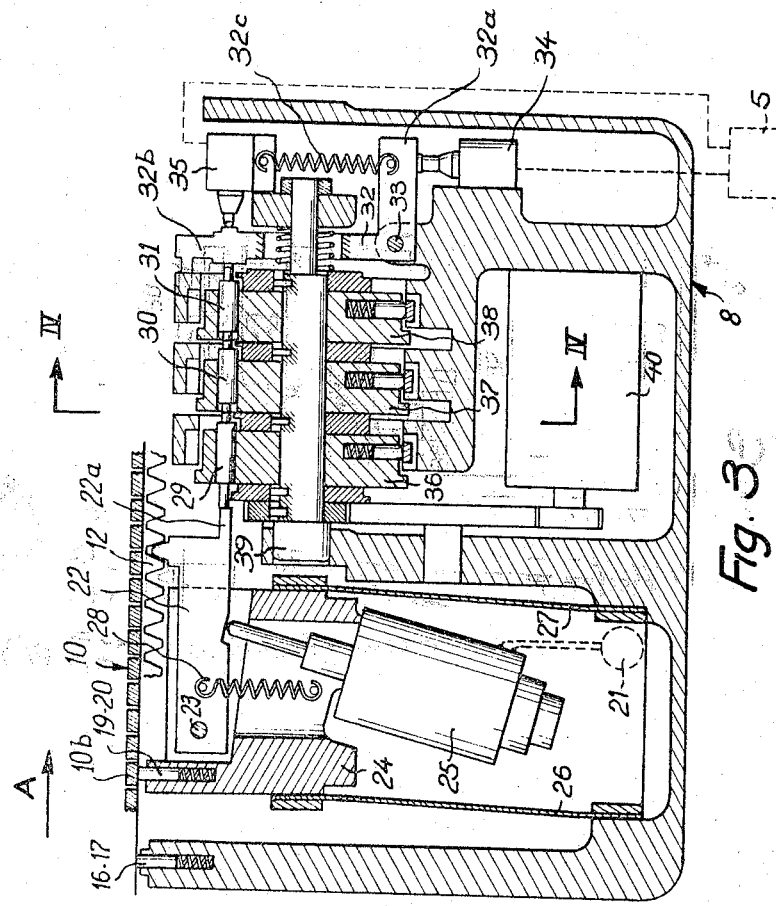
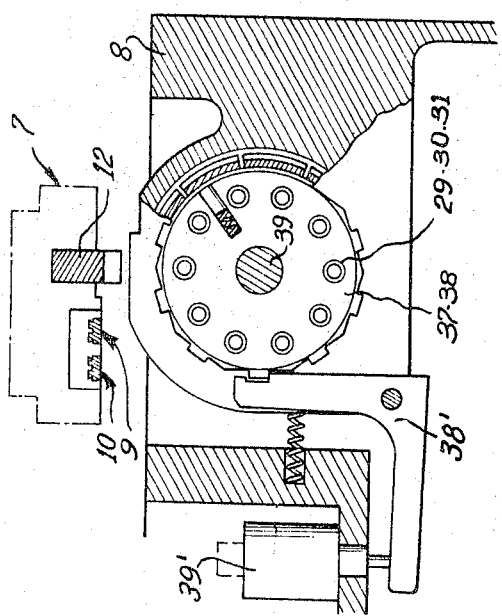
INVENTOR
PIERRE PEGARD
BY
Bacon & Thomas
ATTORNEYS

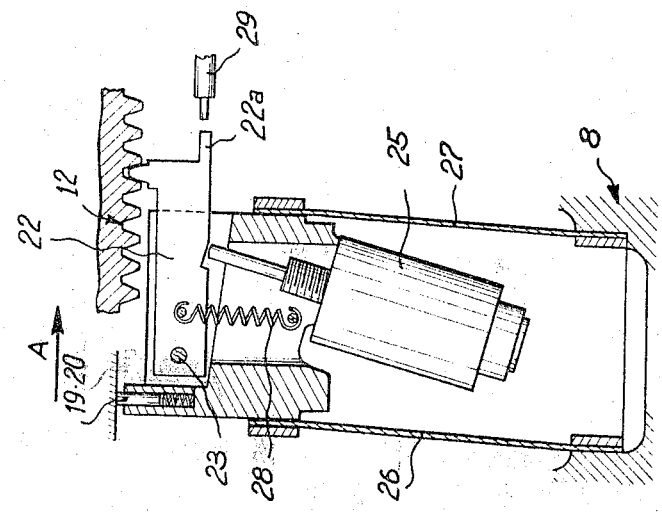
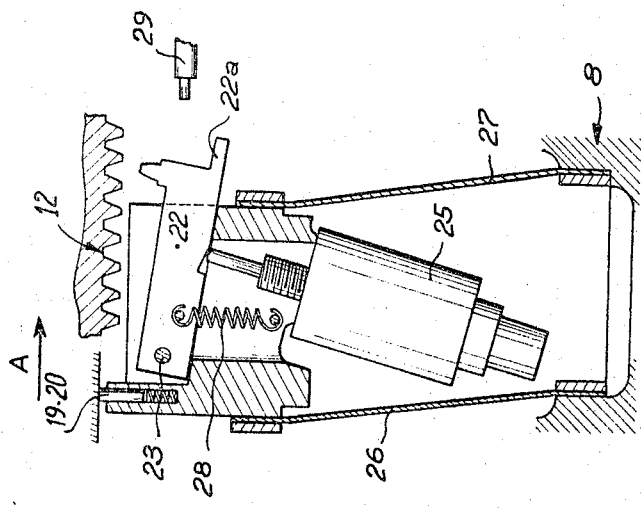

United States Patent Office 3,307,083
Patented Feb. 28, 1967

3,307,083
DEVICE FOR THE CONTROL OF THE DISPLACEMENT OF A MOVABLE ELEMENT APPLICABLE ESPECIALLY TO MACHINE TOOLS WITH NUMERICAL DEFINITION
Pierre Pegard, Courbevoie, France, assignor to Societe Anonyme des Ateliers G.S.P. (Guillemin-Sergot-Pegard) Courbevoie (Seine), France, a French society
Filed May 23, 1963, Ser. No. 282,700
Claims priority, application France, May 25, 1962, 898,696
8 Claims. (Cl. 317—157)

This invention relates to a device for the control of the displacement of a movable element, applicable especially to machine tools with numerical definition.

Devices for the control of the displacement of movable elements of machine tools are already known. These control devices generally comprise complicated and burdensome electronic assemblies, of the analogy type.

The present invention has the object of remedying the drawbacks of the known devices, by proposing a particularly simple control device making use only of the combination of conventional mechanical and electrical systems.

The invention is applicable more especially to devices for the control of the displacement of work tables of machine tools and to the control of the rotation of divider plates. However the invention is not limited to these two advantageous applications, but is usable for the control of rectilinear displacement or rotation of a movable element.

According to a first characteristic of the invention, the control device comprises at least one row of contact studs insulated electrically from one another, which can be connected selectively to a source of electric energy, for example by means of a rotary precision-marking commutator. Furthermore at least one brush which is movable in relation to the said row of contact studs is connected electrically to a relay which directs the execution of a desired operation. One or the other of the two elements, namely the row of contact studs or the brush, can of course be fixed on the movable element, the displacement of which is controlled.

By "desired operation" applicant means either the retardation of a drive motor for the moving element, or the halting of this motor, or reversal of movement of the movable element.

According to one more particular characteristic of the invention, the device comprises two rows of contact studs insulated electrically from one another and capable of being connected selectively to a source of electric energy. In this case two brushes are connected to move together, respectively, one over each of the rows of studs. Furthermore at least one stud of the first row is of a length corresponding to that of a whole number of studs of the second row which are precisely associated with the said stud of the first row. Each of the brushes is connected electrically to a relay, controlling the desired operations.

It should be here indicated that with each of the rows of studs it is possible to associate one or more relays, each of these relays being intended to command the execution of operations which must take place successively in the course of the displacement of the movable element.

Figure 6:
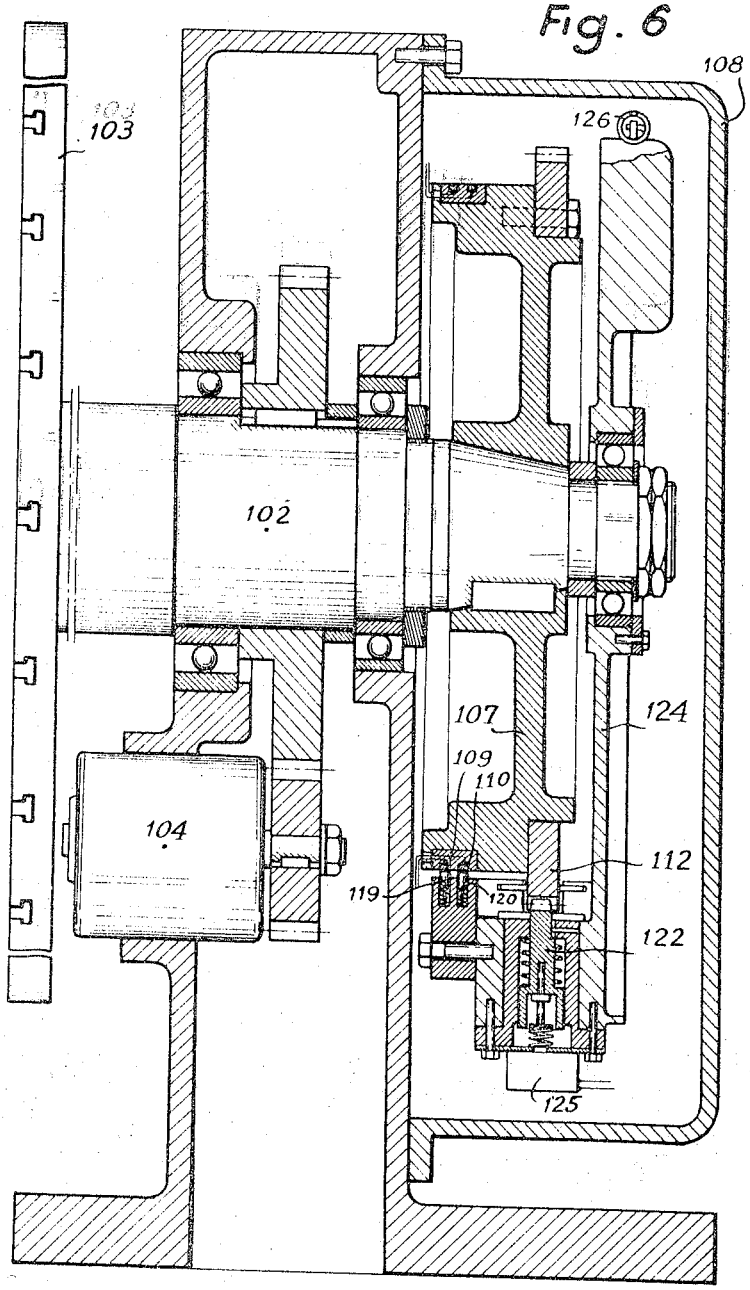

The invention will be better understood and various secondary characteristics and its advantages will appear in the course of the description of an advantageous form of embodiment thereof, given solely by way of example, with reference to the accompanying drawings, wherein:

FIGURE 1 is a perspective view of a work table of a machine tool equipped with a device for the control of the displacement in accordance with the invention, FIGURE 2a is a view in the direction of the arrow F of FIG. 1 of the two rows of contact studs and of an associated rack which are represented diagrammatically in dot-and-dash lines in FIGURE 1, FIGURE 2b is a view in the direction of the arrow G of FIG. 2a of the elements as represented in FIGURE 2a, FIGURE 3 is a section along the line III—III in FIGURE 2b, showing more especially a movable element co-operating with the rack which may be seen in FIGURE 2, FIGURES 3a and 3b are partial views similar to FIGURE 3, corresponding to different positions of the movable element co-operating with the rack, FIGURE 4 is a section along the line IV—IV in FIGURE 3, FIGURE 5 is schematic diagram representing the elements effecting the connection of the contact studs to the supply source, FIGURE 6 is another of embodiment showing the arrangement of the various elements in the case where the invention is applied to a rotary divider plate.

In the drawings referring to FIGURE 1 there may be seen the frame 1 of a machine tool comprising on its upper part slide-ways 2 upon which a work table 3 can move. The movement of the table is effected for example by means of an electric motor 4, the shaft 6 of which has a threaded part co-operating with a nut 3a fixed to the table 3, A contactor 5 of known type permits of varying the speed of the output shaft 6 of the motor 4, but this contactor can be replaced by a gear box or the like, without thereby departing from the scope of the invention.

On the side of the movable table 3 there is mounted a studded bar designated by the general reference 7 and which will be described hereinafter with reference to FIGURES 2a and 2b. On the frame 1 there is also fixed a device 8 for the detection and reading of the voltages applied to the studs of the bar 7.

Referring now to FIGURE 2a and FIGURE 5 it may be seen that the studded bar 7 comprises a first row of contact studs 9, such as 9a, 9b, 9c etc., for example ten centimetres in length; opposite each of them there are situated studs 10, such as 10a, 10b, 10c, etc., the length of which is a fraction of that of the contact studs 9, for example a tenth. The studs of each row are embedded in a support 11 which insulates them electrically from one another and from the mass of the studded bar 7.

Mounted on the studded bar 7 there is a rack 12 the pitch of which is equal to the length of the studs 10, so that to each interval included between two successive teeth of the rack there corresponds a stud 10 of the second row (FIGURE 3).

As may also be seen from FIGURE 5, all the studs 10 carrying the same reference, for example the studs 10a, are connected electrically with one another and with one and the same terminal 13a of a commutator 13, the common point 13' of which is connected to one of the terminals 14a of a current source 14. However it should be noted that for better understanding the drawing only the connections of the contact studs 10a, 10b, 10c have been represented, but it is quite apparent that the same is the case for all the other studs 10. Furthermore each of the studs 9, for example the stud 9a, is connected electrically to the terminal 15a of a commutator 15, the common point 15' of which is connected to the second terminal 14b of the supply source 14.

Referring now to FIGURE 2b, the details of the detection device 8 may be seen. It comprises essentially a first group of two brushes 16 and 17 associated respectively with the rows of studs 9 and 10, the connection of these brushes being visible from FIGURE 5. They are connected to the two terminals of a relay 18 commanding any desired operation. In the precise case of the example described here, the relay 18 controls the contactor 5 for change of speed of the motor 4 (FIGURE 1).

A second group of brushes 19 and 20 (FIGURES 3 and 5) associated respectively with the rows of studs 9 and 10 are also connected to a relay 21 which can command any other desired operation and more particularly the halting of the drive motor 4.

However in the precise case described here, the relay 21 does not command the halting of the motor 4 but commands a sequence of operations by means of elements which will now be described.

For this purpose there is provided a finger 22 mounted for pivoting at 23 on a support 24. An electro-magnet 25 acts upon the finger 22 so as to engage it in the rack 12 fixed on the studded bar 7. The electro-magnet 25 is controlled by the relay 21 and it should further be noted that the brushes 19 and 20 associated with this relay are fixed on the support 24. Furthermore a spring 28 is attached to the finger 22 and tends to constantly urge it away from the rack 12 against the action of the electro-magnet 25.

The support 24 furthermore can itself move parallel to the movement of the table and with a reduced travel, by reason of its mounting on two elastic blades 26 and 27 fixed on the frame of the detection box 8.

The finger 22 furthermore possesses a lug 22a capable of coming into contact with a series of calibrated keys 29, 30 and 31, in the course of the movement of the finger parallel with the movement of the table. The last key 31 can act itself upon a lever 32 articulated at 33 on the frame of the detection box 8 and held pressed upon the said detection box by a spring 32c exerting its force against the action of the key 31. The arm 32a of the lever can itself act upon an electric contact 34 capable of independently controlling retardation of the motor 4 through the intermediary of the contactor 5. Finally the arm 32b of the lever has a calibrated thickness and can act upon a second electric contact 35 for stopping the motor 4 through the intermediary of the contactor 5.

The calibrated keys such as 29, 30 and 31 are contained in a set of three drums 36, 37 and 38 pivoting freely on a spindle 39 and driven in rotation by a motor 40, through the intermediary of a known device, for example friction clutches. It is further apparent that the drums can be immobilised in rotation when their position corresponds with the desired displacement of the table. However the means of immobilisation of the drums are not described in detail, but are nevertheless represented at 38' and 39' in FIGURE 4.

The operation of the control device is then as follows. It will be supposed that it is desired to move the table 3 in order to bring it to the position 21.435 centimetres. The first operation is the setting up of the final position of the table on the control device.

Firstly the commutator 15 (FIGURE 5) is placed in such manner as to connect the contact stud 9c to the current source 14. As already indicated, the studs 9 have a length of a decimetre and this first operation is consequently the marking of the number of decimetres of the position, it being understood that the stud 9a corresponds to the positions less than 10 centimetres.

Then the commutator 13 is placed in the desired position 13b for indication of the centimetres, which has the effect of connecting the contact studs 10b to the current source. Finally the drums 36, 37 and 38 are rotated, and halted when the keys 29, 30 and 31 correspond to the desired length, in the present case 0.435 centimetres.

The setting up operation being terminated, the motor 4 is starting, which moves the table 3 at its maximum speed in the direction of the arrows A. The various elements contained in the detection box 8 are then in the position as represented in FIGURE 3a. The brushes 16, 17 and 19, 20 move over the corresponding studs. When the brush 16 (FIGURE 5) is situated on the stud 9c which is energised and simultaneously the brush 17 is situated on the stud 10b of the centimetres which is energised, the relay 18 is energised and trips the contactor 5 which reduces the rotation of the motor to a first slow speed.

As the table 3 continues its movement in the direction A, the brushes 19 and 20 are in turn simultaneously energised, causing energisation of the relay 21 which effects the energisation of the electro-magnet 25 and consequently the engagement of the finger 22 in the rack 12, in the hollow corresponding to the stud 10c situated opposite the stud 9c (FIGURE 3b). The finger 22 is driven in the direction A by the movement of the rack 12, as also the support 24 and the brushes 19 and 20. The lug 22a of the finger 22 thrusts the keys 29, 30 and 31 one against the other then against the arm 32b of the lever 32, which pivots against the action of the spring 32c (FIGURE 3). The arm 32a of the lever 32 actuates the electric contact 34 which through the intermediary of the governing contactor 5 slows the motor 4 to a second slow speed lower than the previous speed. As the translational movement of the table 3 continues in the direction A, the contact 35 is in turn operated by the arm 32b of the lever 32, then causing the stopping of the table at the desired position. The table can be used in this position for machining work.

During this time the following desired position can be pre-selected by modifying the position of the commutators 13 and 15 and of the drums 36, 37 and 38.

However it must be noted that the modification of the position of any one of the two commutators 13 and 15 de-energises the relay 21 and consequently frees the electromagnet 25, permitting the finger 22 to leave the rack 12 under the action of the spring 28 and permitting the support 24 to return into its initial position (FIGURE 3a) under the action of the elastic blades 26 and 27.

The invention is not of course limited to the form of embodiment which has just been described, but on the contrary covers all variants thereof. More particularly it is quite apparent that the rows of contact studs can be disposed in concentric or other circles.

Thus in FIGURE 6 there is represented the application of the invention to a rotary divider plate. In this figure the elements corresponding to those which have already been described with reference to FIGURES 1 to 5 will be designated by the same reference numerals augmented by the number 100.

The pivot 102 fast with the divider plate 103 is driven by a motor 104 similar to the motor 4, supplied through the intermediary of a contactor similar to the contactor 5. On the pivot 102 there is keyed a plate 107 having on its periphery two circular and concentric rows of contact studs 109 and 110. A circular toothed crown 112 is also fixed on the plate 107. Two brushes (not shown) similar to the brushes 16 and 17 are fixed on the detection box 108 and disposed opposite the rows of contact studs 109 and 110; they are connected in the manner indicated above with reference to FIGURE 5. Two further brushes 119 and 120 are also disposed opposite the rows of studs 109 and 110 and are supported by a plate 124 pivoting in relation to the divider plate 103 against the action of a spring 126 similar to the elastic blades 26 and 27. The brushes 119 and 120 are connected in the manner indicated in FIGURE 5.

The plate 124 further supports a finger 122 operated by an electro-magnet 125 in dependence upon a relay not shown but similar to the relay 21, connected to the brushes 119 and 120.

The finger 122 finally possesses a lug (not shown), similar to the lug 22a, capable of acting upon calibrated keys to cause the retarding and stopping of the drive motor of the divider plate 103.

The operation of the device for the control of displacement as represented in FIGURE 6 is entirely analogous with that described above with reference to FIGURES 1 to 5. Therefore it does not appear necessary to explain it afresh, since it will be apparent to the person acquainted with the art.

It should further be observed that in the case where two or more rows of contact studs exist, the length of a stud associated with a plurality of other studs may be not equal to the sum of the lengths of these other studs if a suitable means connect the brushes corresponding to each of these two rows of studs for the proper relative movement.

Finally it will be noted that in certain particular cases it is possible to use one single row of contact studs with one or more brushes controlling the various operations in predetermined positions. More particularly it has already been pointed out that it was possible to command the reverse of the movement of a movable element when it had reached a predetermined position.

I claim:

1. Control apparatus comprising: a fixed member; a movable member movable relative to said fixed member; driving means for moving said movable member; a row of insulated electrical contacts on one of said members; means for selectively connecting any one of said contacts to a source of electric power; a brush carried by the other member and movable along said row of contacts upon movement of said movable member; a relay electrically connected to said brush; control means for said drive means, said relay being arranged to actuate said control means, whereby engagement of said brush with the selected contact connected to said source of electrical power actuates said relay to operate said control means.

2. Apparatus as defined in claim 1 including a second row of insulated electrical contacts on said one member and means for selectively connecting any one of said contacts to said source of electric power; a second brush on said other member arranged to move along said second row of contacts; both said brushes being connected to said relay; at least one contact of one of said rows having a length, in the direction of movement of said movable member, equal to that of a plurality of the contacts in the other row.

3. Apparatus as defined in claim 1 wherein said movable member is mounted for rectilinear movement and wherein said row of contacts is rectilinear.

4. Apparatus as defined in claim 1 wherein said movable member is rotatably mounted and wherein said row of contacts is arranged as a circle concentric to the axis of rotation.

5. Apparatus as defined in claim 2 wherein said two rows of contacts are parallel.

6. Apparatus as defined in claim 2 wherein said two rows of contacts define concentric circles.

7. Apparatus as defined in claim 1 including a toothed rack on said one member adjacent said row of contacts and fixed relative thereto, the distance between the teeth of said rack being equal to the spacing of adjacent contacts of said row; a finger movably mounted on the other member and being movable into interlocking engagement with said rack; moving means for moving said finger toward and from said rack; and means for operating said moving means in response to actuation of said relay.

8. Apparatus as defined in claim 7 wherein said finger is further resiliently mounted on said other member for yieldable movement thereon in a direction parallel to the length of said rack.

References Cited by the Examiner

UNITED STATES PATENTS 2,487,066   11/1949   Moen _____ 318—164 X

FOREIGN PATENTS 813,974   5/1959   Great Britain.

MILTON O. HIRSHFIELD, *Primary Examiner.*

LEE T. HIX, D. YUSKO, *Examiners.*